(12) United States Patent
Newman et al.

(10) Patent No.: US 9,117,449 B2
(45) Date of Patent: Aug. 25, 2015

(54) EMBEDDED SYSTEM FOR CONSTRUCTION OF SMALL FOOTPRINT SPEECH RECOGNITION WITH USER-DEFINABLE CONSTRAINTS

(75) Inventors: Michael Jack Newman, Somerville, MA (US); Robert Roth, Newton, MA (US); William D. Alexander, Lexington, MA (US); Paul van Mulbregt, Wayland, MA (US)

(73) Assignee: Nuance Communications, Inc., Burlington, MA (US)

( * ) Notice: Subject to any disclaimer, the term of this patent is extended or adjusted under 35 U.S.C. 154(b) by 218 days.

(21) Appl. No.: 13/456,959

(22) Filed: Apr. 26, 2012

(65) Prior Publication Data

US 2013/0289994 A1 Oct. 31, 2013

(51) Int. Cl.
*G10L 15/14* (2006.01)
*G10L 21/00* (2013.01)
*G10L 15/22* (2006.01)
*H04M 1/725* (2006.01)
*G10L 15/32* (2013.01)

(52) U.S. Cl.
CPC .......... *G10L 15/22* (2013.01); *G10L 15/32* (2013.01); *H04M 1/72519* (2013.01); *G10L 2015/223* (2013.01); *H04M 2250/74* (2013.01)

(58) Field of Classification Search
CPC ..... G01L 15/22; G01L 15/32; H04M 1/72519
USPC .......................................... 704/254, 275, 251
See application file for complete search history.

(56) References Cited

U.S. PATENT DOCUMENTS

| | | | |
|---|---|---|---|
| 5,097,509 A * | 3/1992 | Lennig | 704/240 |
| 5,428,707 A | 6/1995 | Gould et al. | |
| 5,774,859 A | 6/1998 | Houser et al. | |
| 5,802,305 A | 9/1998 | McKaughan et al. | |
| 5,983,186 A | 11/1999 | Miyazawa et al. | |
| 6,070,140 A * | 5/2000 | Tran | 704/275 |

(Continued)

FOREIGN PATENT DOCUMENTS

KR  100744301 B1  7/2007

OTHER PUBLICATIONS

International Search Report from corresponding PCT application No. PCT/US2013/037679, mailed Aug. 13, 2013, pp. 3.

(Continued)

*Primary Examiner* — Brian Albertalli
(74) *Attorney, Agent, or Firm* — Holland & Knight LLP; Mark H. Whittenberger, Esq.

(57) ABSTRACT

Techniques disclosed herein include systems and methods that enable a voice trigger that wakes-up an electronic device or causes the device to make additional voice commands active, without manual initiation of voice command functionality. In addition, such a voice trigger is dynamically programmable or customizable. A speaker can program or designate a particular phrase as the voice trigger. In general, techniques herein execute a voice-activated wake-up system that operates on a digital signal processor (DSP) or other low-power, secondary processing unit of an electronic device instead of running on a central processing unit (CPU). A speech recognition manager runs two speech recognition systems on an electronic device. The CPU dynamically creates a compact speech system for the DSP. Such a compact system can be continuously run during a standby mode, without quickly exhausting a battery supply.

22 Claims, 5 Drawing Sheets

(56) References Cited

U.S. PATENT DOCUMENTS

| | | | |
|---|---|---|---|
| 6,092,043 A | 7/2000 | Squires et al. | |
| 6,195,634 B1 * | 2/2001 | Dudemaine et al. | 704/231 |
| 6,397,186 B1 | 5/2002 | Bush et al. | |
| 6,408,396 B1 | 6/2002 | Forbes | |
| 6,411,926 B1 | 6/2002 | Chang | |
| 6,449,496 B1 | 9/2002 | Beith et al. | |
| 6,594,630 B1 | 7/2003 | Zlokarnik et al. | |
| 6,756,700 B2 | 6/2004 | Zeng | |
| 6,941,265 B2 | 9/2005 | Bi et al. | |
| 6,965,786 B2 | 11/2005 | Qu et al. | |
| 7,114,090 B2 | 9/2006 | Kardach et al. | |
| 7,720,683 B1 * | 5/2010 | Vermeulen et al. | 704/254 |
| 7,774,204 B2 | 8/2010 | Mozer et al. | |
| 8,181,046 B2 | 5/2012 | Marcu et al. | |
| 8,666,751 B2 | 3/2014 | Murthi et al. | |
| 2008/0167860 A1 | 7/2008 | Goller et al. | |
| 2009/0043580 A1 | 2/2009 | Mozer et al. | |
| 2010/0082343 A1 * | 4/2010 | Levit et al. | 704/257 |
| 2010/0088093 A1 | 4/2010 | Lee et al. | |
| 2010/0185448 A1 | 7/2010 | Meisel | |
| 2010/0217596 A1 * | 8/2010 | Morris et al. | 704/251 |
| 2011/0035219 A1 | 2/2011 | Kadirkamanathan et al. | |
| 2011/0054899 A1 | 3/2011 | Phillips et al. | |
| 2013/0080167 A1 * | 3/2013 | Mozer | 704/246 |
| 2013/0080171 A1 * | 3/2013 | Mozer et al. | 704/251 |

OTHER PUBLICATIONS

International Preliminary Report on Patentability from corresponding PCT Application No. PCT/US2013/037679, mailed Nov. 6, 2014, 10 pages.

* cited by examiner

EMBEDDED SYSTEM FOR CONSTRUCTION OF SMALL FOOTPRINT SPEECH RECOGNITION WITH USER-DEFINABLE CONSTRAINTS

BACKGROUND

The present disclosure relates to speech recognition, and particularly to speech recognition providing voice-activated or voice command functionality.

Speech recognition, or automatic speech recognition, involves a computerized process that identifies spoken words. There are many uses for speech recognition, including speech transcription, speech translation, ability to control devices and software applications by voice, call routing systems, voice search of the Internet, etc. Speech recognition systems can optionally be paired with spoken language understanding systems to extract meaning and/or commands to execute when interacting with systems.

Speech recognition systems are highly complex and operate by matching an acoustic signature of an utterance with acoustic signatures of words. This matching can optionally be in combination with a statistical language model. Thus, both acoustic modeling and language modeling are used in the speech recognition process. Acoustic models can be created from audio recordings of spoken utterances as well as associated transcriptions. The acoustic model then defines statistical representations of individual sounds for corresponding words. A speech recognition system uses the acoustic model to identify a sequence of sounds, while the speech recognition system uses the statistical language model to identify possible word sequences from the identified sounds.

Speech recognition providing voice-activated or voice command functionality enables speakers to control devices and systems by speaking various instructions. For example, a speaker can utter a command to execute a specific task or utter a query to retrieve specific results. Spoken input can follow a rigid set of phrases that perform specific tasks, or spoken input can be natural language, which is interpreted by a natural language unit of a speech recognition system. Voice command functionality is becoming increasingly popular on portable devices, especially battery-powered portable devices such as cell phones, laptops, and tablet computers.

SUMMARY

A voice command mode of a given device can either be actively listening for spoken commands, or turned off until a user manually activates the voice command mode. For example, some mobile phones include functionality to execute tasks in response to spoken user input, such as to call a particular individual, retrieve email messages, play a particular song, and so forth. Typically, a user will push a button on a phone (or select an icon) to activate the voice command mode, and then speak a command such as: "Call John Smith." In response, the phone or device will initiate a call to a corresponding telephone number, such as a telephone number retrieved from a list of contacts or other directory.

While such voice command functionality is convenient, accessing this functionality nevertheless requires a user to push a button or otherwise navigate to a menu for selection. Thus, initiating the voice command mode or feature is not a hands-free process. Moreover, leaving a voice command speech recognition engine running continuously, as a hands-free alternative, is not desirable because of the significant power demands of a conventional speech recognition engine. For example, a typical mobile phone continuously running a conventional voice recognition program as part of a voice command mode will exhaust a supply of battery power within about a couple of hours or so (depending on battery specifics). Power consumption is also a concern for wired devices or appliances because using a conventional voice recognition system can negatively affect device efficiency ratings. As such, there is a need for voice activated "wake-up" functionality that initiates a voice recognition program of a mobile phone or other device, but that uses much less power, thereby providing efficient hands-free operation.

Accordingly, techniques disclosed herein include systems and methods that enable a voice trigger that wakes-up a device or, rather, causes the device to make all/remaining voice commands active, similar to manual initiation of voice command functionality (pushing a button). In addition, such a voice trigger is dynamically programmable or customizable. For example, a speaker can program or designate a particular phrase (word or words) as the voice trigger, and change this voice trigger phrase as desired. In general, techniques herein execute a voice-activated wake-up system that operates on a digital signal processor (DSP) or other low-power, secondary processing unit of an electronic device. Running a voice recognition program on a DSP would be problematic because conventional speech recognition systems are relatively large. Another issue with running a wake-up feature on the DSP is providing a dynamically programmable wake-up feature. While a wake-up phrase that is preprogrammed, such as during assembly of the mobile phone, facilitates running the wake-up system on the DSP, allowing a user to specify the command word is a difficult problem.

Techniques herein include running two speech recognition systems on an electronic device. A first speech system, that is relatively large, runs on the central processing unit (CPU) of a device, and a second speech system, that is comparatively smaller, runs on the DSP. The CPU of a given portable electronic device typically handles most processing while the electronic device is in an active state. The DSP typically runs on comparatively lower power and is often used for standby processing. For example, when the electronic device is embodied as a mobile telephone, the DSP is typically responsible for listening for incoming phone calls while the phone is in a standby mode (the CPU being in an inactive state). The first speech recognition system takes a custom trigger phrase, and converts speech models and code to a comparatively smaller system. This second speech system is then transferred to the DSP so that the DSP can execute the second speech system while the CPU is inactive, such as when the electronic device is in a standby mode. The DSP, using this second speech system, listens for the custom trigger phrase. Upon detecting that the custom trigger phrase has been uttered, the DSP signals the electronic device to return to an active state, or to a state in which the CPU is responsive to subsequent voice commands. By running the smaller, second speech system on the DSP, the electronic device can provide a hands-free voice-trigger wake-up feature that uses relatively little power.

One embodiment includes a speech recognition manager that executes a speech recognition process or system for managing speech recognition on an electronic device. The speech recognition manager receives configuration input at a voice-activated wake-up function of an electronic device, that is, an interface for configuring the wake-up function. The configuration input includes a trigger phrase. The configuration input is received at a first processor of the electronic device. This electronic device has a second processor in addition to the first processor. The speech recognition manager creates a network of speech recognition states corresponding to the trigger phrase. The network of speech recognition states is created at the first processor using a first speech recognition engine that the first processor executes. The speech recognition manager transfers the network of speech recognition states from the first processor to the second processor, such as from the CPU to the DSP. The speech recognition manager then executes a second speech recognition engine on the second processor using the network of speech recognition states corresponding to the trigger phrase. The second processor executes the second speech recognition engine while the first speech recognition engine of the first processor is in an inactive state. Executing this second speech recognition engine can include continuously analyzing spoken utterances while the first speech recognition engine, or first processor, is in an inactive state. In response to identifying that a particular spoken utterance includes the trigger phrase, the DSP or speech recognition manager signals the first processor to return the first speech recognition engine to an active state, thereby enabling a voice command mode for controlling the electronic device.

Yet other embodiments herein include software programs to perform the steps and operations summarized above and disclosed in detail below. One such embodiment comprises a computer program product that has a computer-storage medium (e.g., a non-transitory, tangible, computer-readable medium, disparately located or commonly located storage media, computer storage media or medium, etc.) including computer program logic encoded thereon that, when performed in a computerized device having a processor and corresponding memory, programs the processor to perform (or causes the processor to perform) the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving configuration input at a voice-activated wake-up function of an electronic device, the configuration input including a trigger phrase, the configuration input being received at a first processor of the electronic device, the electronic device having a second processor in addition to the first processor; creating a network of speech recognition states corresponding to the trigger phrase, the network of speech recognition states being created at the first processor using a first speech recognition engine that the first processor executes; transferring the network of speech recognition states from the first processor to the second processor; and executing a second speech recognition engine on the second processor using the network of speech recognition states corresponding to the trigger phrase, the second processor executing the second speech recognition engine while the first speech recognition engine of the first processor is in an inactive state. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations.

As discussed above, techniques herein are well suited for use in software applications supporting voice command speech recognition. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
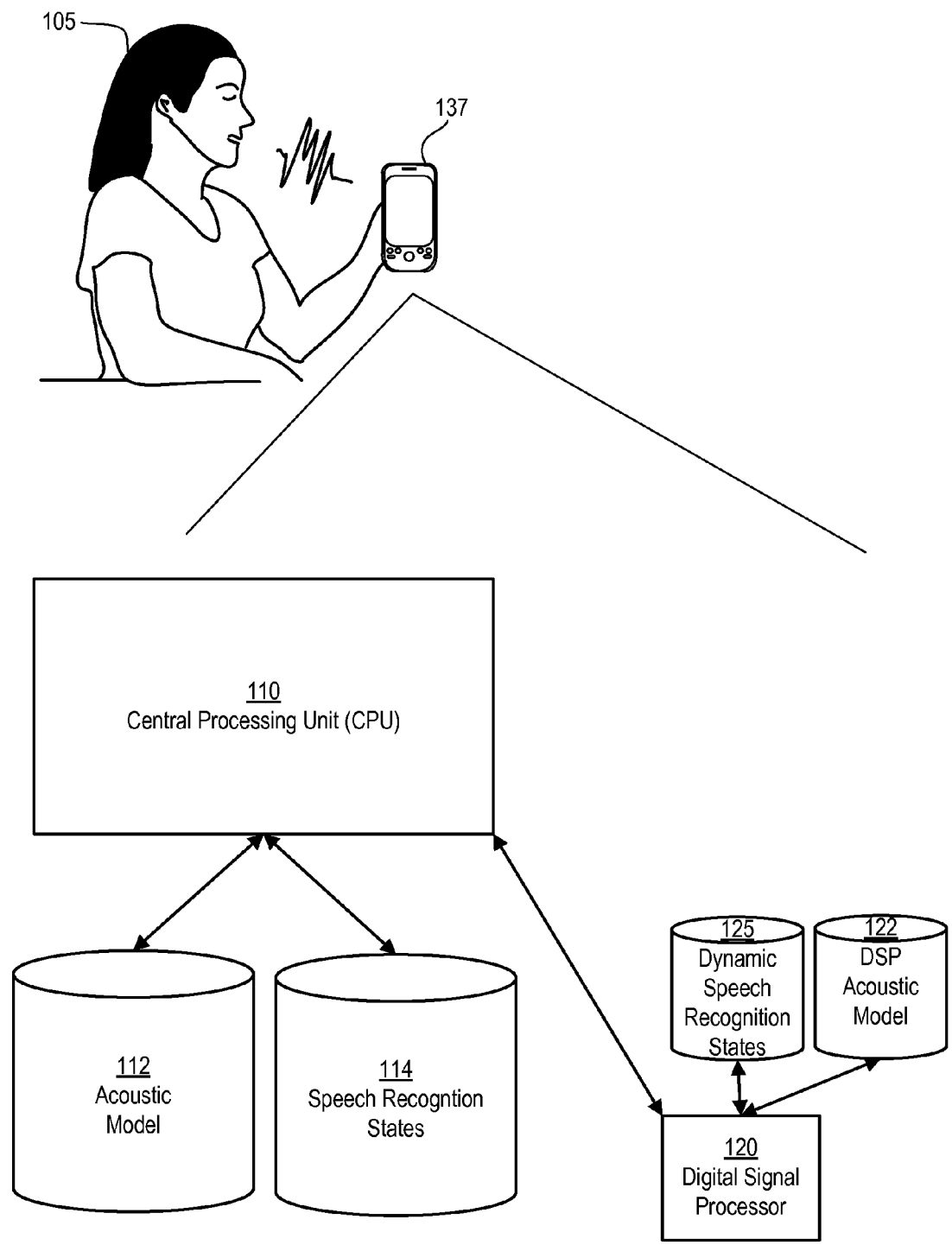
FIG. 1 is a block diagram of a system for a device supporting voice trigger wake-up functionality according to embodiments herein.

Techniques disclosed herein include systems and methods that enable a voice trigger that wakes-up a device or causes the device to make all/remaining voice commands active, similar to manual initiation of voice command functionality (pushing a button). In addition, such a voice trigger is dynamically programmable or customizable. For example, a speaker can program or designate a particular phrase (word or words) as the voice trigger, and this voice trigger phrase can be modified or changed as the user desires. In general, techniques herein execute a voice-activated wake-up system that operates on a digital signal processor (DSP) or other low-power, secondary processing unit of an electronic device instead of running on a central processing unit (CPU).

While techniques disclosed herein can be embodied in many different electronic devices that use two processors, for convenience in describing embodiments, this disclosure will primarily reference a mobile phone, such as a battery powered cellular phone. In a conventional mobile phone, there are typically two processors. There is a main or primary CPU, which is relatively powerful. This CPU handles most processing when the phone is being actively used, such as phone calls, utility applications, email, games, and so forth. Mobile phones also typically include a secondary processor, which is a digital signal processor (DSP). The DSP can function on very low power. The DSP can also run on a higher power mode (relative to itself). For mobile phone functions that run for a very long time, these functions are typically run on the DSP. For example, The DSP is the component of a mobile phone that is active and listening for incoming phone calls while the phone is in a standby mode or not actively being used.

Techniques herein include running two speech recognition systems on an electronic device. A first speech system, that is relatively large, runs on the central processing unit (CPU) of a device, and a second speech system, that is comparatively smaller, runs on the DSP. The CPU speech system can include a full set of speech recognition models for a particular mobile application, such as for recognizing commands to access contacts, email, songs, perform tasks, and run applications. This full set of models enables a user to be able to select a custom phrase or word for use as a spoken wake-up trigger.

The first/primary system receives a custom trigger phrase, then uses this trigger phrase to convert speech models and code to a relatively small system. Thus, the CPU pre-computes the smaller speech system. This system can have two parts: (1) a network of recognition states and (2) acoustic model information. The network of recognition states can be used by a decoder that searches for a best path through a sequence of states. The acoustic model information can include measurements from recordings of speech. Embodiments can function very well with a very small subset of acoustic model information used for the DSP wake-up feature. These two parts are combined together in to a small system, that is, small compared to the CPU voice recognition system. By way of a non-limiting example, a network of recognition states (data compiled by the CPU) can have a size of approximately 5 kilobytes or 10 kilobytes, as compared to a network from the primary system that can be approximately 300 kilobytes to about 2 megabytes. Thus, this technique provides a significant size reduction.

The custom input (custom trigger phrase) can be specified as a textual input. In alternative embodiments, the input can be spoken and/or entered as text. Audible input can help to improve recognition accuracy by verifying the text input. Note, however, that audible input for a trigger phrase is not needed. The system can execute the wake-up function based on a trigger phrase entered initially only as text. The pre-computed system can then be transferred to the DSP. Techniques can include running a relatively small speech decoder on the DSP. This DSP decoder can, for example, have a code size of around 30 kilobytes. In contrast, a speech decoder running on the CPU can have a size of about 1-2 megabytes.

For example, the DSP recognizer code can have only a few hundred lines of code running on the DSP. In a conventional recognizer, there are typically a dozen modules that are each relatively large. All of these large modules can be replaced by a single module running on the DSP. This single module can be smaller than any of the other modules. In other words, a very specific recognition engine can be created for use on the DSP, instead of running a general recognition engine.

The recognizer on the DSP then functions as a wake-up trigger. For example, the recognizer essentially determines whether the trigger phrase was spoken or not. If the DSP has not recognized the wake-up phrase from spoken utterances received, then nothing happens. If the DSP recognizer determines that the wake-up phrase has been uttered, then the CPU recognizer becomes active and can begin or continue responding to spoken commands or queries.

There exist some devices that can wake-up with a spoken phrase or words, but these trigger words are fixed. That is, a given trigger command is fixed in the electronic device, and cannot be changed. This fixed trigger word is typically set during the manufacturing process. In other words, the trigger word is permanent for the life of the device. In contrast, techniques disclosed herein provide a configurable/changeable trigger word that can be completely customized or specific to a user. Such customization provided herein does not require downloading additional code online, or returning a device to a factory to reconfigure the trigger command.

In embodiments, the training mode or customization interface does not require a spoken utterance, but can use a textual input to create the wake-up system to run on the DSP. While some embodiments can also receive voice input for confirmation of the text input, this is not required. Creating the wake-up system from a textual input only is useful because predefined acoustic models can be reduced to a substantially smaller model, but with a similar recognition performance/accuracy for a given trigger word. Thus, in some embodiments, the acoustic model data that is sent to the DSP system can be abstracted from the pre-existing speaker-independent acoustic model.

One feature is that the DSP acoustic model does not need to be adapted to the voice of a particular user. Instead, the system can select, from the larger model, states that are needed for a particular trigger phrase. For a given trigger phrase, there are a corresponding number of state IDs necessary. By way of a non-limiting example, if the given trigger phrase needs state IDs 2, 7, 48, 138, 455, . . . , then the speech recognition manager or wake-up manager would then pull these state IDs, and renumber them for use in the smaller model. This results in a smaller and more efficient model. Thus, given a sequence of words, the primary system converts this sequence of words to a sequence of phonemes and other conventional speech representations. For a given phrase, there are only a small number of model states that need to be maintained. Thus, most model data does not need be used for a specific wake-up trigger word/phrase. This also means that most of the code used for speech recognition does not need to be used in the smaller system running on the secondary processing unit, such as the DSP.

Referring now to FIG. 1, a user 105 is operating electronic device 137. Electronic device 137 includes voice command functionality including a customizable wake-up feature. User 105 can text input a particular trigger phrase. For example, the user 105 can type in any phrase such as "genius button," "activate John's phone," "sequester," "purple monkey dishwasher," etc. Note that the terms "phrase" or "trigger phrase" as used herein can refer to one word or multiple words. After user 105 enters a trigger phrase (for initial set-up), central processing unit 110 creates a speech recognition system or state for use by digital signal processor 120. CPU 110 can access acoustic model 112 and speech recognition states 114 while generating data for the wake-up functionality. CPU 110, in addition to generating speech recognition states 114, can abstract or gather acoustic model data from acoustic model 112 (speaker-independent acoustic model) for use as acoustic model 122. DSP 120 can then receive this data and store it as dynamic speech recognition states 125. During speech recognition, DSP 120 can then access both the speech recognition states 125 and acoustic model 122. After an initial or new trigger phrase and accompanying data have been created, DSP 120 can then execute a recognition process that monitors speech to identify if the trigger word has been uttered. This wake-up feature can run while the CPU 110 is inactive, on standby, or at least while voice command functionality that executes on the CPU 110 is inactive. The CPU 110 can remain inactive until the trigger phrase is detected. After the DSP 120 detects that that trigger phrase has been spoken, the DSP signals the CPU 120 to return to an active state or a state that can execute a speech engine as well as executing tasks in response to voice input. The given trigger word and corresponding data networks remain on the DSP until a user desires to create a new trigger phrase. Upon receiving a new trigger phrase, the system can repeat the process of creating network states for the DSP 120.

Now more specifically, when a new trigger phrase is received at the CPU 110, this character string can be converted to a sequence of phonemes. This sequence may already exist, or may need to be created. For each phoneme, the manager identifies neighboring phonemes (one on each side) to create a tri-phone. Each tri-phone is then converted into a sequence of states. Each tri-phone has a model for a sequence of acoustic states. Generally, a given tri-phone model has two or a few states: a beginning and an end, or a beginning, a middle, and an end. The result is a set of acoustic model states, which is what is looked-up in an acoustic model for scoring. Tri-phones are thus mapped to acoustic models or acoustic model states, thereby creating a sequence.

Scoring spoken utterances by a speech recognition engine is typically a relative scoring process. The speech recognition manager can use a recognition grammar. This recognition grammar can evaluate the trigger-phrase, as well as evaluate other paths that go through a set of decoy words or phrases so that the speech recognition manager does not recognize too often (false recognition). The recognition grammar includes paths through all of the decoy words and acoustic model states. With this configuration, the manager does not need the rest of the acoustic models or any of the vocabulary models. This recognition grammar part is what is compiled into relatively compact data used by the DSP.

Speech recognition states can be modeled as a probability distribution, a sequence of gaussians. When a spoken utterance is detected, the spoken utterance is converted into frames, which are compared against probability distributions to get scores. The decoys can be selected as a set of random words, which could be similar or completely different to the trigger phrase. The speech model then evaluates the spoken utterance, as well as one or more of the decoys to establish a reference comparison score. If the score of the spoken utterance is better (by a predetermined amount) than the score of the random/decoy word, then the manager determines that the spoken utterance is recognized. Using a model that looks for an absolute score can optionally be used, but this technique is typically less accurate. Using a relative score enables accurately recognizing spoken words while accounting for background noise and speech.

An advantage of the DSP recognition engine herein is that the DSP recognition engine (during trigger phrase recognition) does not need to hypothesize, convert the word to a sequence of phonemes, convert words to tri-phones, and convert the tri-phones to a sequence states. These process steps are not necessary because the DSP recognizer can function on the sequence of states created by the CPU. Such a decoder can be referred to as a finite state transducer (FST). Thus, an FST network is what is compiled on the primary CPU, and then passed down for the FST decoder to run on the DSP, and this is executed dynamically in response to customizable trigger phrase input, thereby providing a system customized to a certain phrase, which system is substantially smaller than the initial system running on the CPU. For the DSP decoder, in some embodiments, the code can be the same, while the network that the CPU compiles is different. Data can be collected initially for building acoustic model 122, but after building a single acoustic model, the speech recognition manager can make as many different small models (network states 125) as desired.

During speech analysis, the DSP receives a spoken utterance, which it processes through the network to get a score. The DSP decoder also processes a random/decoy word, such as "dog" or "catapult," etc. If the DSP decoder cannot identify a path for the spoken utterance through the network, then that hypothesis is dropped. If both the spoken utterance and the decoy word make it though the network, then the spoken utterance (being the trigger word) should score much higher than the decoy word, which score differential can indicate to the system that the trigger word was spoken, and causes the CPU to wake-up or become active again. The decoy word can run anytime any word is spoken. In this wakeup mode, the DSP can be analyzing all words that it hears. Having a small number of decoy words helps the process run faster, such as around 100 or so decoy words. Alternatively, the decoy phrases could be discarded in place of using a generic speech model, which would function with moderate accuracy in detecting the trigger word. Removing the phrases can reduce memory consumption, but can also reduce accuracy. Note that programming the DSP (or secondary processing unit) can be dependent on specific hardware and configuration aspects of a given electronic device. For example, the speech recognition manager operating in a mobile phone may have a different configuration then embodiments operating in a tablet computer, desktop computer, remote control, appliance, automobile, etc.

Figure 5:
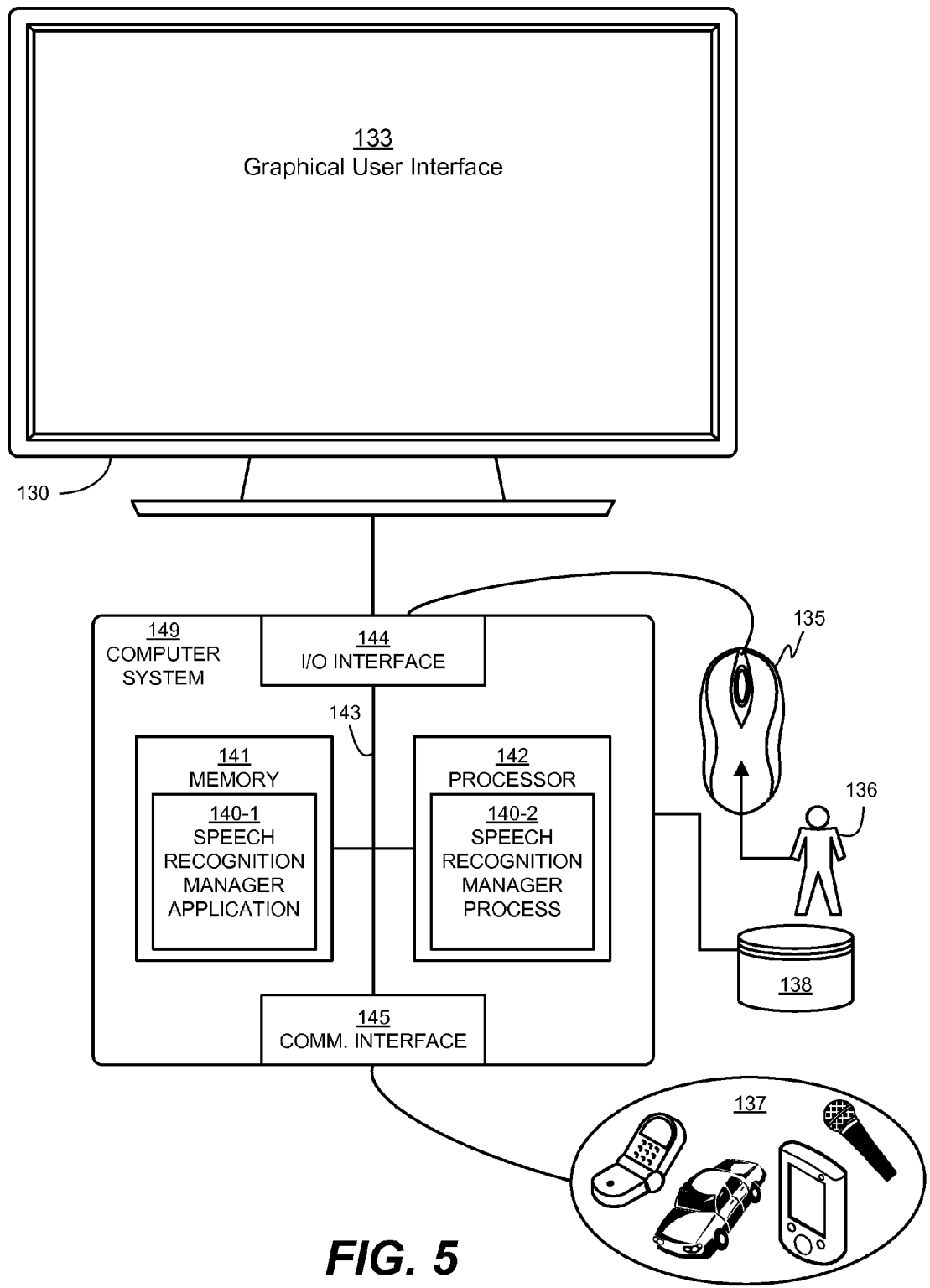
FIG. 5 is an example block diagram of a speech recognition manager operating in a computer/network environment according to embodiments herein.

FIG. 5 illustrates an example block diagram of a speech recognition manager 140 operating in a computer/network environment according to embodiments herein. Computer system hardware aspects of FIG. 5 will be described in more detail following a description of the flow charts.

Functionality associated with speech recognition manager 140 will now be discussed via flowcharts and diagrams in FIG. 2 through FIG. 4. For purposes of the following discussion, the speech recognition manager 140 or other appropriate entity performs steps in the flowcharts.

Figure 2:
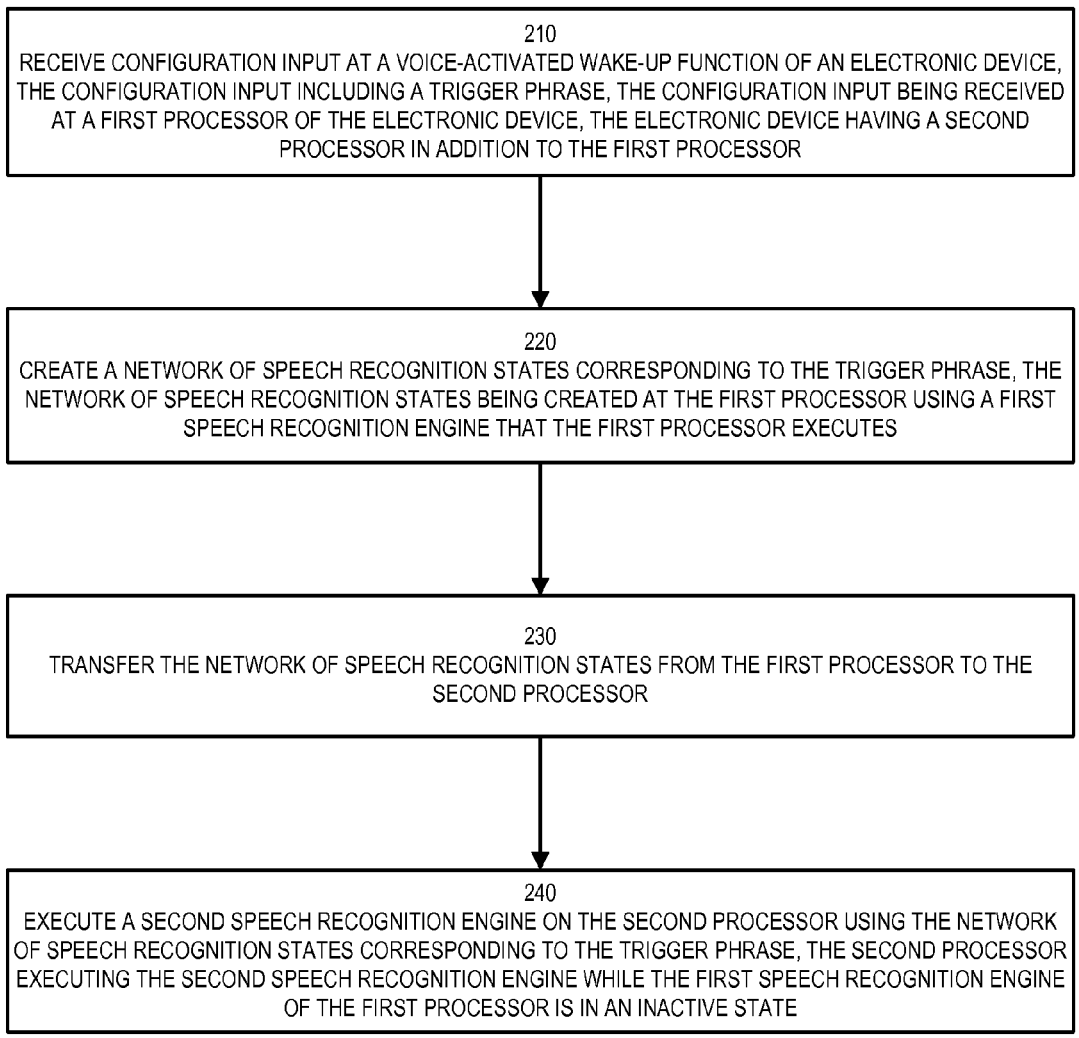
FIG. 2 is a flowchart illustrating an example of a process supporting voice trigger wake-up according to embodiments herein.

Now describing embodiments more specifically, FIG. 2 is a flow chart illustrating embodiments disclosed herein. In step 210, the speech recognition manager receives configuration input at a voice-activated wake-up function of an electronic device. The configuration input includes a trigger phrase. In other words, a user accesses a wake-up customization menu to set a specific phrase (word or group of words), and types in that phrase, or otherwise selects a custom phrase. The configuration input is received at (sent to) a first processor of the electronic device. The electronic device has a second processor in addition to the first processor.

In step 220, the speech recognition manager creates a network of speech recognition states corresponding to the trigger phrase, that is, based on the trigger phrase. The network of speech recognition states is created at the first processor using a first speech recognition engine that the first processor executes.

In step 230, the speech recognition manager transfers the network of speech recognition states from the first processor to the second processor, that is, the network of speech recognition states is transferred to storage at or accessible to the second processor.

In step 240, the speech recognition manager executes a second speech recognition engine on the second processor using the network of speech recognition states corresponding to the trigger phrase. The second processor executes the second speech recognition engine while the first speech recognition engine of the first processor is in an inactive state. Note that the first processor or CPU may be in an active state, but the first speech recognition engine nevertheless is comparatively inactive or not responsive to voice command tasks. Thus whether the electronic device is on standby or being actively used (such as to view content, check messages, etc.), a voice command mode of the electronic device is not actively listening for tasks to execute. In other embodiments, the CPU does not need to be completely inactive, but can be operating in a reduced-power mode relative to power consumption when being actively used, such as by a user interacting with the electronic device.

Figure 3:
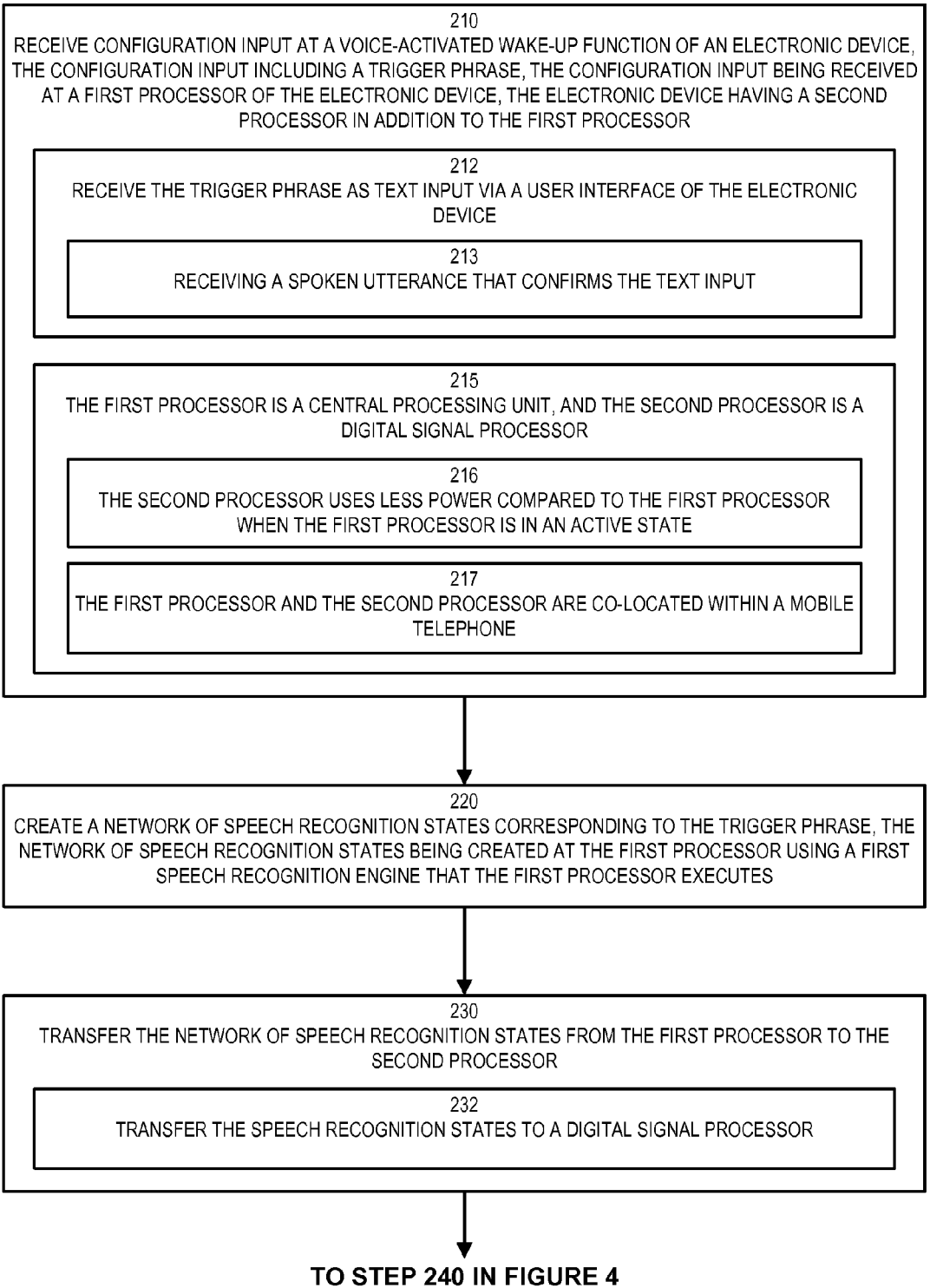
FIGS. 3-4 are a flowchart illustrating an example of a process supporting voice trigger wake-up according to embodiments herein.
Figure 4:
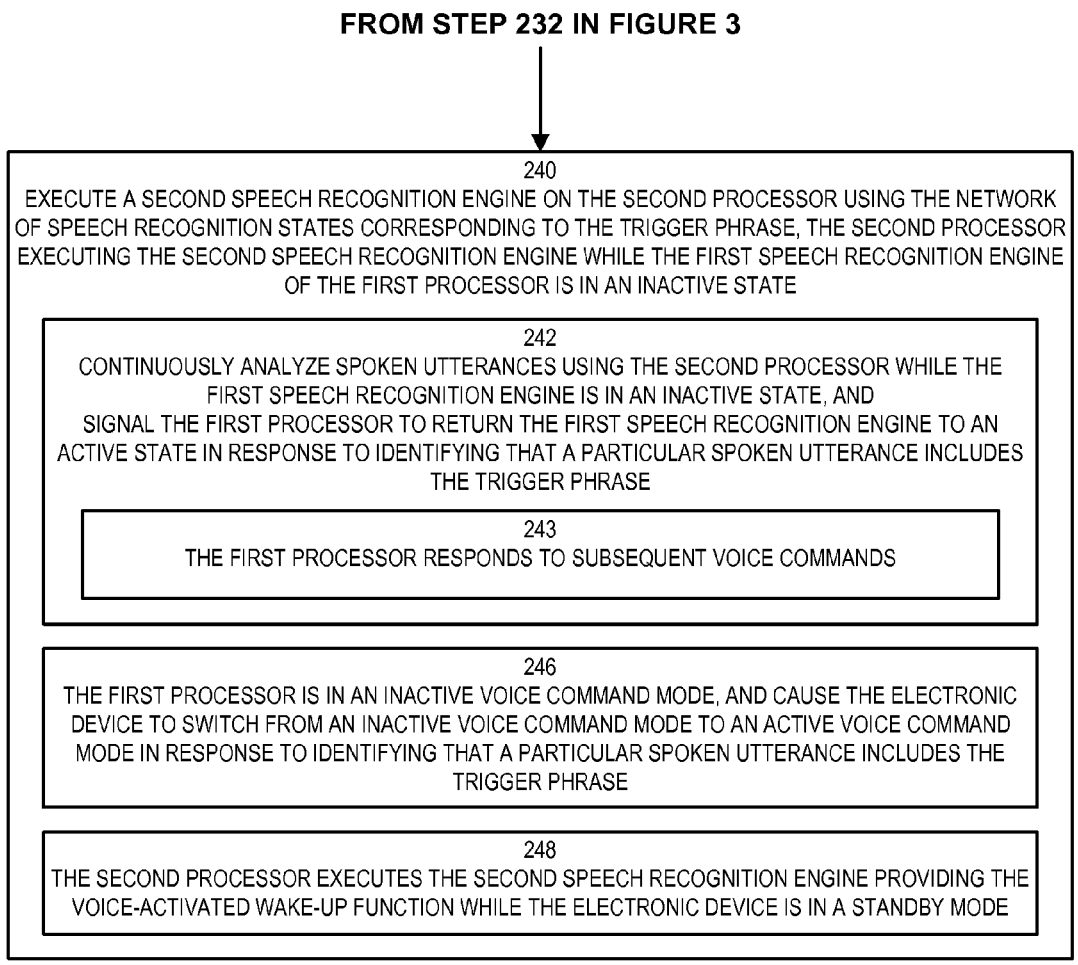

FIGS. 3-4 include a flow chart illustrating additional and/or alternative embodiments and optional functionality of the speech recognition manager 140 as disclosed herein. In step 210, the speech recognition manager receives configuration input at a voice-activated wake-up function of an electronic device. The configuration input includes a trigger phrase. The configuration input is received at (sent to) a first processor of the electronic device. The electronic device has a second processor in addition to the first processor.

In step 212, the speech recognition manager receives the trigger phrase as text input via a user interface of the electronic device. For example, a user types a phrase that the user desires to speak for the electronic device to wake-up.

In step 213, the speech recognition manager receives the spoken utterance that confirms the text input. While text input is sufficient, speech recognition manager can also process a spoken utterance of the text input to confirm accurate recognition.

In step 215, the first processor is a central processing unit, and the second processor is a digital signal processor. In step 216, the second processor uses less power compared to the first processor when the first processor is in an active state. By operating the wake-up features on the lower-power processor, an electronic device can listen for the trigger word without draining the battery too rapidly. In step 217, the first processor and the second processor are co-located within a mobile telephone.

In step 220, the speech recognition manager creates a network of speech recognition states corresponding to the trigger phrase. The network of speech recognition states is created at the first processor using a first speech recognition engine that the first processor executes.

In step 230, the speech recognition manager transfers the network of speech recognition states from the first processor to the second processor. In step 232, the speech recognition manager transfers the speech recognition states to a digital signal processor.

In step 240, the speech recognition manager executes a second speech recognition engine on the second processor using the network of speech recognition states corresponding to the trigger phrase. The second processor executes the second speech recognition engine while the first speech recognition engine of the first processor is in an inactive state.

In step 242, the second speech recognition engine continuously analyzes spoken utterances using the second processor, while the first speech recognition engine is in an inactive state. The speech recognition manager then signals the first processor to return the first speech recognition engine to an active state in response to identifying that a particular spoken utterance includes the trigger phrase.

In step 243, the first processor responds to subsequent voice commands.

In step 246, the first processor is in an inactive voice command mode, and causes the electronic device to switch from an inactive voice command mode to an active voice command mode in response to identifying that a particular spoken utterance includes the trigger phrase.

In step 248, the second processor executes the second speech recognition engine providing the voice-activated wake-up function while the electronic device is in a standby mode.

In other embodiments, the new state sequence and smaller acoustic model can be created at a remote server, instead of being created at the electronic device. In such an embodiment, the electronic device can transmit a new trigger phrase to the server or the cloud. The new trigger phrase can be entered via the electronic device as a text input. The remote server than creates the network of speech recognition states corresponding to the trigger phrase, and then transmits a created state sequence and acoustic model to the electronic device, which can then be used by the secondary processor or DSP.

Continuing with FIG. 6, the following discussion provides a basic embodiment indicating how to carry out functionality associated with the speech recognition manager 140 as discussed above. It should be noted, however, that the actual configuration for carrying out the speech recognition manager 140 can vary depending on a respective application. For example, computer system 149 can include one or multiple computers that carry out the processing as described herein.

In different embodiments, computer system 149 may be any of various types of devices, including, but not limited to, a cell phone, a personal computer system, desktop computer, laptop, notebook, or netbook computer, mainframe computer system, handheld computer, workstation, network computer, router, network switch, bridge, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the speech recognition manager 140 of computer system 149 to communicate over a network and, if necessary, retrieve any data required to create views, process content, communicate with a user, etc. according to embodiments herein.

As shown, memory system 141 is encoded with speech recognition manager 140-1 that supports functionality as discussed above and as discussed further below. Speech recognition manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the speech recognition manager 140-1. Execution of the speech recognition manager 140-1 produces processing functionality in speech recognition manager process 140-2. In other words, the speech recognition manager process 140-2 represents one or more portions of the speech recognition manager 140 performing within or upon the processor 142 in the computer system 149.

It should be noted that, in addition to the speech recognition manager process 140-2 that carries out method operations as discussed herein, other embodiments herein include the speech recognition manager 140-1 itself (i.e., the unexecuted or non-performing logic instructions and/or data). The speech recognition manager 140-1 may be stored on a non-transitory, tangible computer-readable storage medium including computer readable storage media such as floppy disk, hard disk, optical medium, etc. According to other embodiments, the speech recognition manager 140-1 can also be stored in a memory type system such as in firmware, read only memory (ROM), or, as in this example, as executable code within the memory system 141.

In addition to these embodiments, it should also be noted that other embodiments herein include the execution of the speech recognition manager 140-1 in processor 142 as the speech recognition manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing descriptions of embodiments of the invention are not intended to be limiting. Rather, any limitations to embodiments of the invention are presented in the following claims.

The invention claimed is:

1. A computer-implemented method for managing speech recognition, the computer implemented method comprising:
   receiving configuration input at a voice-activated wake-up function of an electronic device, the configuration input including a trigger phrase, the configuration input being received at a first processor of the electronic device, the electronic device having a second processor in addition to the first processor, wherein the configuration input and at least one decoy word is first received at the second processor;
   creating a finite state transducer network including a network of speech recognition states corresponding to the trigger phrase, the network of speech recognition states being created at the first processor using a first speech recognition engine that the first processor executes, wherein the trigger phrase is evaluated using a recognition grammar without applying a vocabulary model;
   transferring the network of speech recognition states from the first processor to the second processor; and
   executing a second speech recognition engine on the second processor using the network of speech recognition states corresponding to the trigger phrase, the second processor executing the second speech recognition engine while the first speech recognition engine of the first processor is in an inactive state, wherein the second speech recognition engine includes a finite state transducer decoder configured to execute the finite state transducer network;
   wherein the first processor is a central processing unit, and wherein the second processor is a digital signal processor and wherein the first processor and the second processor are co-located within a mobile telephone.

2. The computer-implemented method of claim 1, wherein executing the second speech recognition engine includes:
   continuously analyzing spoken utterances using the second processor while the first speech recognition engine is in an inactive state; and
   in response to identifying that a particular spoken utterance includes the trigger phrase, signaling the first processor to return the first speech recognition engine to an active state.

3. The computer-implemented method of claim 2, wherein returning the first speech recognition engine to an active state includes the first processor responding to subsequent voice commands.

4. The computer-implemented method of claim 1, wherein executing the second speech recognition engine while the first speech recognition engine of the first processor is in an inactive state includes the first processor being in an inactive voice command mode; and
   in response to identifying that a particular spoken utterance includes the trigger phrase, causing the electronic device to switch from an inactive voice command mode to an active voice command mode.

5. The computer-implemented method of claim 1, wherein the second processor executes the second speech recognition engine providing the voice-activated wake-up function while the electronic device is in a standby mode.

6. The computer-implemented method of claim 1, wherein transferring the speech recognition states to the second processor includes transferring the speech recognition states to a digital signal processor (DSP).

7. The computer-implemented method of claim 1, wherein receiving the configuration input includes receiving the trigger phrase as text input via a user interface of the electronic device.

8. The computer-implemented method of claim 7, wherein receiving the configuration input includes receiving a spoken utterance that confirms the text input.

9. The computer-implemented method of claim 1, wherein the second processor uses less power compared to the first processor when the first processor is in an active state.

10. A system for managing speech recognition, the system comprising:
    a first processor;
    a second processor; and
    a memory coupled to the processors, the memory storing instructions that, when executed by the processors, cause the system to perform the operations of:
    receiving configuration input at a voice-activated wake-up function of an electronic device, the configuration input including a trigger phrase, the configuration input being received at a first processor of the electronic device, the electronic device having a second processor in addition to the first processor, wherein the configuration input and at least one decoy word is first received at the second processor;

creating a finite state transducer network including a network of speech recognition states corresponding to the trigger phrase, the network of speech recognition states being created at the first processor using a first speech recognition engine that the first processor executes, wherein the trigger phrase is evaluated using a recognition grammar without applying a vocabulary model;

transferring the network of speech recognition states from the first processor to the second processor; and executing a second speech recognition engine on the second processor using the network of speech recognition states corresponding to the trigger phrase, the second processor executing the second speech recognition engine while the first speech recognition engine of the first processor is in an inactive state, wherein the second speech recognition engine includes a finite state transducer decoder configured to execute the finite state transducer network;

wherein the first processor is a central processing unit, and wherein the second processor is a digital signal processor and wherein the first processor and the second processor are co-located within a mobile telephone.

11. The system of claim 10, wherein executing the second speech recognition engine includes:
continuously analyzing spoken utterances using the second processor while the first speech recognition engine is in an inactive state; and
in response to identifying that a particular spoken utterance includes the trigger phrase, signaling the first processor to return the first speech recognition engine to an active state.

12. The system claim 11, wherein returning the first speech recognition engine to an active state includes the first processor responding to subsequent voice commands.

13. The system of claim 10, wherein executing the second speech recognition engine while the first speech recognition engine of the first processor is in an inactive state includes the first processor being in an inactive voice command mode; and
in response to identifying that a particular spoken utterance includes the trigger phrase, causing the electronic device to switch from an inactive voice command mode to an active voice command mode.

14. The system of claim 10, wherein the second processor executes the second speech recognition engine providing the voice-activated wake-up function while the electronic device is in a standby mode.

15. The system of claim 10, wherein transferring the speech recognition states to the second processor includes transferring the speech recognition states to a digital signal processor (DSP).

16. The system of claim 10, wherein receiving the configuration input includes receiving the trigger phrase as text input via a user interface of the electronic device.

17. A computer program product including a non-transitory computer-storage medium having instructions stored thereon for processing data information, such that the instructions, when carried out by a processing device, cause the processing device to perform the operations of:
receiving configuration input at a voice-activated wake-up function of an electronic device, the configuration input including a trigger phrase, the configuration input being received at a first processor of the electronic device, the electronic device having a second processor in addition to the first processor, wherein the configuration input and at least one decoy word is first received at the second processor;

creating a finite state transducer network including a network of speech recognition states corresponding to the trigger phrase, the network of speech recognition states being created at the first processor using a first speech recognition engine that the first processor executes, wherein the trigger phrase is evaluated using a recognition grammar without applying a vocabulary model;

transferring the network of speech recognition states from the first processor to the second processor; and executing a second speech recognition engine on the second processor using the network of speech recognition states corresponding to the trigger phrase, the second processor executing the second speech recognition engine while the first speech recognition engine of the first processor is in an inactive state, wherein the second speech recognition engine includes a finite state transducer decoder configured to execute the finite state transducer network;

wherein the first processor is a central processing unit, and wherein the second processor is a digital signal processor and wherein the first processor and the second processor are co-located within a mobile telephone.

18. The computer program product of claim 17, wherein executing the second speech recognition engine includes:
continuously analyzing spoken utterances using the second processor while the first speech recognition engine is in an inactive state; and
in response to identifying that a particular spoken utterance includes the trigger phrase, signaling the first processor to return the first speech recognition engine to an active state.

19. A computer-implemented method for managing speech recognition, the computer implemented method comprising:
receiving configuration input at a voice-activated wake-up function of an electronic device, the configuration input including a trigger phrase, the electronic device having a first processor that executes a first speech recognition engine, the electronic device having a second processor in addition to the first processor, wherein the configuration input and at least one decoy word is first received at the second processor;

transmitting the configuration input to a remote server computer;

creating a finite state transducer network including a network of speech recognition states corresponding to the trigger phrase, the network of speech recognition states being created at the remote server computer, wherein the trigger phrase is evaluated using a recognition grammar without applying a vocabulary model;

receiving the network of speech recognition states corresponding to the trigger phrase at the electronic device;

transferring the network of speech recognition states to the second processor; and executing a second speech recognition engine on the second processor using the network of speech recognition states corresponding to the trigger phrase, the second processor executing the second speech recognition engine while the first speech recognition engine of the first processor is in an inactive state, wherein the second speech recognition engine includes a finite state transducer decoder configured to execute the finite state transducer network;

wherein the first processor is a central processing unit, and wherein the second processor is a digital signal processor and wherein the first processor and the second processor are co-located within a mobile telephone.

20. The computer-implemented method of claim 19, wherein executing the second speech recognition engine includes:
   continuously analyzing spoken utterances using the second processor while the first speech recognition engine is in an inactive state; and
   in response to identifying that a particular spoken utterance includes the trigger phrase, signaling the first processor to return the first speech recognition engine to an active state.

21. The computer-implemented method of claim 20, wherein returning the first speech recognition engine to an active state includes the first processor responding to subsequent voice commands.

22. The computer-implemented method of claim 19, wherein executing the second speech recognition engine while the first speech recognition engine of the first processor is in an inactive state includes the first processor being in an inactive voice command mode; and
   in response to identifying that a particular spoken utterance includes the trigger phrase, causing the electronic device to switch from an inactive voice command mode to an active voice command mode.

* * * * *